United States Patent
Park

[11] Patent Number: 5,892,737
[45] Date of Patent: Apr. 6, 1999

[54] DISK ROULETTE CONTROL METHOD AND APPARATUS FOR USE IN AN OPTICAL DISK CHANGER

[75] Inventor: Dong-Kyun Park, Seoul, Rep. of Korea

[73] Assignee: Daewoo Electronics Co., Ltd., Seoul, Rep. of Korea

[21] Appl. No.: 993,841

[22] Filed: Dec. 18, 1997

[30] Foreign Application Priority Data

Dec. 31, 1996 [KR] Rep. of Korea .................. 1996-81017

[51] Int. Cl.[6] .................................................. G11B 17/22
[52] U.S. Cl. ................................................. 369/33; 369/37
[58] Field of Search .................................. 369/33, 37, 34, 369/36, 38, 39, 178, 50

[56] References Cited

U.S. PATENT DOCUMENTS

| | | | |
|---|---|---|---|
| 5,193,079 | 3/1993 | Ko et al. ................................... | 369/37 |
| 5,422,869 | 6/1995 | Versleegers ............................... | 369/37 |
| 5,528,567 | 6/1996 | Kim ......................................... | 369/37 |
| 5,563,857 | 10/1996 | Park ........................................ | 369/37 |
| 5,734,630 | 3/1998 | Nishigori et al. ......................... | 369/33 |

*Primary Examiner*—Tan Dinh
*Attorney, Agent, or Firm*—Anderson, Kill & Olick, P.C.

[57] ABSTRACT

A disk roulette controller effectively controls the rotation of a tray roulette employing an electrode contact technique for use in a disk changer. When a user's instruction to search a target dish is received, a drive signal is supplied to a motor, thereby revolving the tray roulette in a predetermined direction. Next, a pulse width modulation (PWM) and a one-shot pulse signal are generated in response to a pulse signal indicating whether or not a scanner electrode contacts an end electrode of the target dish. In response to the PWM signal, the rotation speed of the revolving tray roulette is reduced and, thereafter, in response to the one-shot pulse signal, the tray roulette is stopped at a pickup position.

18 Claims, 2 Drawing Sheets

DISK ROULETTE CONTROL METHOD AND APPARATUS FOR USE IN AN OPTICAL DISK CHANGER

FIELD OF THE INVENTION

The present invention relates to an optical disk changer; and, more particularly, to a method and apparatus for effectively controlling the rotation of a tray roulette for use in the optical disk changer by employing an electrode contact technique.

DESCRIPTION OF THE PRIOR ART

Conventional optical disk players which are used to reproduce video and/or audio signals recorded on an optical disk and output them through a display element and/or a speaker, include a CDP (Compact Disk Player), a LDP (Laser Disk Player), a CDGP (Compact Disk Graphic Player) and the like. As is well known, the CDP is typically an equipment capable of reproducing the audio signals only; and each of the LDP and the CDGP is an equipment capable of reproducing the video as well as the audio signals simultaneously. Also, a VCDP (Video Compact Disk Player) is capable of reproducing video and audio signals. These disk players are becoming more and more popular because of their high-performance characteristics, e.g., high S/N ratio, low noise, little distortion and no ghost.

In some applications such as a motion picture film, however, the amount of data, e.g., the whole volume of data of the motion picture film, is too large to be contained on a single disk. A disk changer is a device proposed to solve such problem, wherein the disk changer loads several disks on a tray roulette and the large amount of data is divided onto the disks. By using such a disk changer, the data can also be selectively or sequentially reproduced from the disks in response to a user's instructions.

A conventional disk changer comprises a base to support a tray roulette having a plurality of dishes, e.g., three dishes, each for cradling a disk loaded thereon, a spindle around which the tray roulette rotates, a sensor which is attached to the base and generates an identification (ID) code to be used to identify each dish. A unique ID code is assigned to each of, e.g., the three dishes. A target dish may be easily sought out by identifying its ID code, wherein the target dish is the one that holds the disk selected by the user for reproducing the data recorded thereon among the disks loaded on the tray roulette. The sensor located at a position on a line making a preset angle counterclockwise with a radial line crossing a pickup spot is used in sensing the ID codes, wherein the pickup spot is a position where the data on the target dish is reproduced. During the rotation of the tray roulette, the sensor generates pulses corresponding to the ID code of the dish passing it so that a rotation controller can identify each dish based on the pulses.

More specifically, upon receiving a user's instructions to search a target dish, the tray roulette is revolved around its spindle by a motor driver which drives a motor. While the tray roulette rotates, the sensor generates, for example, a single pulse for a first dish, two pulses for a second dish and three pulses for a third dish. The rotation controller identifies each dish by counting the number of pulses from the sensor. In general, for controlling the rotation of the tray roulette, a start/end pulse signal which consists of four consecutive pulses between ID pulse groups is utilized. A set of two pulses out of the four pulses is referred to as a start code, and the set of the two remaining pulses is called an end code.

To check the ID of the target dish while the tray roulette rotates clockwise, the rotation controller counts the number of pulses emerging after the start code and compares the counted number of pulses with that of pulses corresponding to the ID of the dish currently positioned at the pickup spot. If the two numbers compared are different from each other, the rotation controller sends a drive signal to the motor driver to rotate the motor further. If the two numbers compared are equal, then the rotation controller detects a falling edge of the first pulse which is the starting point of the end pulse generated after the ID code. Upon detecting the falling edge, the rotation controller provides the motor driver with a PWM (Pulse Width Modulation) signal having a predetermined duty ratio for use in reducing the rotation speed of the motor, wherein the PWM signal consists of a string of consecutive pulses whose duty ratio varies. Then, when the rotation controller detects a rising edge of the second pulse, indicating the end of the end pulse, it outputs a reverse-polarity one-shot pulse to the motor driver, thereby forcing the tray roulette to stop rotating.

In case the tray roulette is controlled through the use of the conventional rotation controller, however, the rotation controller, on the basis of the codes received from the sensor, identifies the codes received by counting the number of pulses in the codes received and checking the duty ratio of the pulses, compares the codes received with the code of the target dish inputted by the user, and provides the drive signal and the reverse-polarity one-shot pulse to the motor drive. Therefore, it takes a rather long time to go through the whole process, thereby resulting in a rather long search time for the target dish.

Another type of a roulette rotation controller developed to ameliorate the drawback mentioned above is disclosed in a copending commonly assigned application, U.S. Ser. No. 08/931,446, filed on Sep. 16, 1997 Dong-Kyun Park, "METHOD AND APPARATUS FOR DISK ROULETTE CONTROL FOR USE IN AN OPTICAL DISK CHANGER". This roulette rotation controller controls the rotation of a tray roulette by using disk ID codes, start codes and end codes issued while a scanner electrode prepared on the tray roulette contacts a plurality of disk ID electrodes, start electrodes and end electrodes formed on a base of a disk changer.

In the prior art tray roulette controller, however, it is difficult to uniformly form the disk ID electrodes between pairs of the stop and the end electrodes on the base. Further, the rotation controller still uses the pulses generated from the disk ID electrodes to identify the ID of each disk, resulting in a prolonged processing time.

SUMMARY OF THE INVENTION

It is, therefore, a primary object of the present invention to provide an improved method and apparatus capable of providing a fast rotation control for a tray roulette by effectively controlling the rotation thereof through the use of an electrode contact technique.

It is another object of the invention to provide a disk changer system with a simplified structure.

In accordance with of one aspect of the present invention, there is provided a method for controlling the rotation of a tray roulette for use in a disk changer, wherein the tray roulette has a plurality of dishes, each dish cradling a disk, the method comprising the steps of:

(a) providing a logic signal with a predetermined bit length for use in deciding the rotation and direction of the tray roulette in response to a user's instruction to search a target dish, and rotating the tray roulette based on a drive signal obtained by using the logic signal, the target dish being a dish holding a disk selected by the user to reproduce signals recorded on the disk at a pickup position;

(b) generating a pulse signal when a scanner electrode attached to the tray roulette contacts an end electrode which corresponds to the user's instruction while the tray roulette rotates, wherein the end electrode is attached to a base supporting the tray roulette;

(c) producing, in response to the pulse signal, a PWM signal with a predetermined duty ratio, the PWM signal being used for reducing the rotation speed of the tray roulette;

(d) issuing a one-shot pulse signal after the generation of the PWM signal, the one-shot pulse signal being used for stopping the tray roulette when the target dish reaches the pickup position; and (e) controlling the rotation of the tray roulette based on the PWM signal, the one-shot pulse signal, the logic signal and the drive signal.

In accordance with of another aspect of the present invention, there is provided a disk changer system comprising:

a tray roulette having a plurality of dishes, each dish cradling a disk;

a base for supporting the tray roulette;

pairs of electrodes, each pair including a start electrode and an end electrode attached to the base, wherein each pair is separated by an equal angular space;

a scanner electrode attached to the tray roulette, wherein the scanner electrode slidingly contacts start electrodes and end electrodes as the tray roulette rotates around a spindle which is fixed on the base;

a rotation controller for generating a motor control signal for use in driving a motor in response to a user's instructions to search a target dish;

a motor for driving the tray roulette based on the motor control signal, the motor being associated with the tray roulette by using the spindle; and a motor driver for supplying a power corresponding to the motor control signal to the motor.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENT

Figure 1:
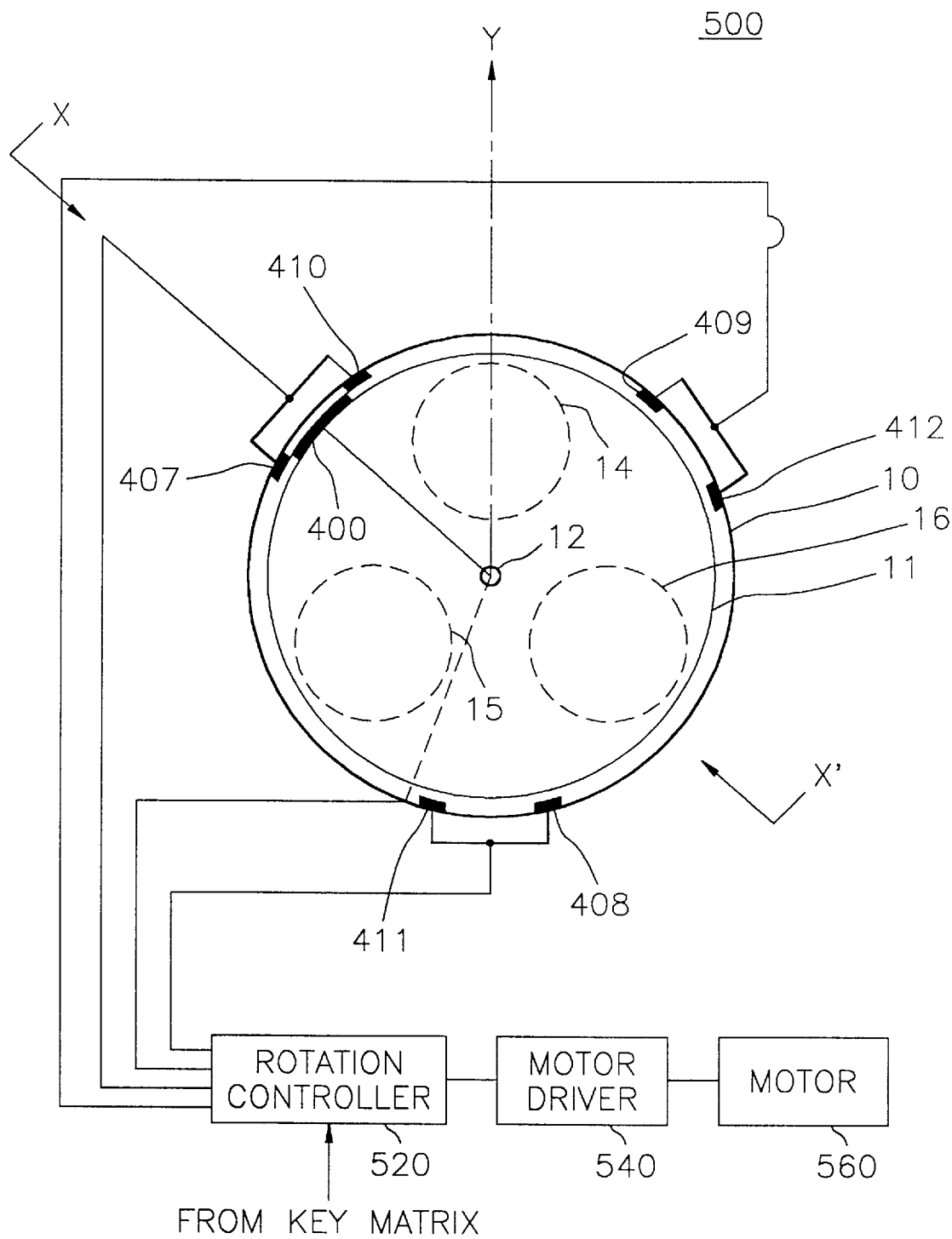
FIG. 1 shows a disk changer system in accordance with the present invention.

FIG. 1 illustrates a disk changer system 500 for controlling the rotation of a tray roulette 11 in accordance with the present invention shown along X—X' axis. For the sake of illustration, it is assumed that the tray roulette system 500 is equipped with three dishes, each of them being capable of cradling a disk. Under such assumption, the disk changer system 500 in accordance with the present invention comprises a base 10, a tray roulette 11, a spindle 12 which is fixed on the base 10, three dishes 14 to 16, a scanner electrode 400, a rotation controller 520, a motor driver 540 and a motor 560. As shown in FIG. 1, the system 500 further comprises three pairs of start and end electrodes 407 and 410, 408 and 411, 409 and 412 in case the tray roulette 11 rotates counterclockwise, wherein each of the three pairs of the start and the end electrodes is equi-spaced from each other.

The base 10 supports the tray roulette 11 by using the spindle 12, wherein the tray roulette 11 is provided with the three dishes 14 to 16, each dish cradling a disk and rotating around the spindle 12 in compliance with the rotation of the motor 560. The scanner electrode 400, attached to the side wall of the tray roulette 11, contacts the start and the end electrodes while the tray roulette 11 rotates and provides a fixed voltage to the start and end electrodes contacted.

When the scanner electrode 400 contacts any of the start electrodes 407 to 409 and the end electrodes 410 to 412 while the tray roulette 11 revolves, the electrode contacted generates a corresponding start or stop pulse signal for use in controlling the start or the halt of the motor 560. The rotation controller 520 generates a motor control signal to be used to control the rotation of the motor 560 by using a novel electrode contact technique of the invention which will be described in detail with reference to FIG. 1 hereinafter. The motor control signal is then supplied to the motor 560 through the motor driver 540, thereby controlling the rotations of the motor 560 and the tray roulette 11.

Figure 2:
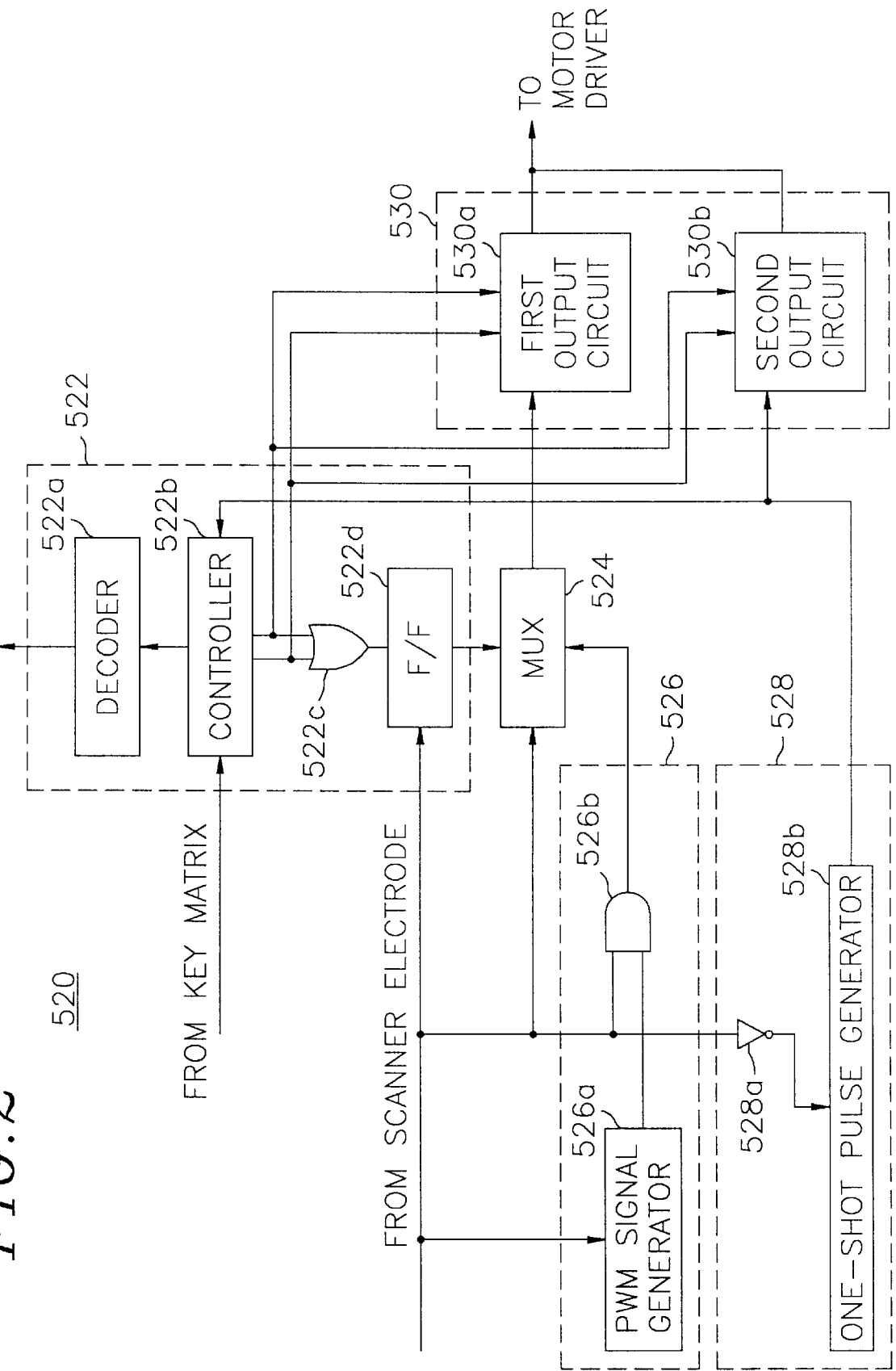
FIG. 2 presents a detailed diagram of a rotation controller shown in FIG. 1.

Turning to FIG. 2, there is illustrated a detailed diagram of the rotation controller 520 shown in FIG. 1. The rotation controller 520 includes a control unit 522, a multiplexer (MUX) 524, a PWM signal generation device 526, a one-shot pulse generation device 528, and an output device 530.

Specifically, when a target dish is selected by a user to reproduce data recorded on a disk thereof, i.e., when a user's instructions corresponding to the target dish is received from a key matrix (not shown), ID code of the target dish is issued at a controller 522b of the control unit 522. Also at the controller 522b, a logic signal of a predetermined bit length, e.g., 2-bits, is generated for use in rotating the tray roulette 11 and deciding a direction of the rotation of the motor 560. In a preferred embodiment of the invention, if the 2-bit logic signal is "10", it is designed that the motor 560 rotates clockwise; and, if the 2-bit logic signal is "01", it is made that the motor 560 revolves counterclockwise. The ID code is transferred to a decoder 522a, while the 2-bit logic signal is supplied to an OR gate 522c, and to a first output circuit 530a of the output device 530. Hereafter, it is assumed that the target dish is the one with a numeral number 15 shown in FIG. 1 for the sake of illustration.

At the OR gate 522c, the 2-bit logic signal is logically combined to provide an OR operated signal as a drive signal to the MUX 524 through a flip/flop (F/F) 522d. The MUX 524 receives the drive signal provided through the F/F 522d and an output from the PWM signal generation device 526 to output the drive signal to the first output circuit 530a at an initial time. The first output circuit 530a generates a motor control signal based on the 2-bit logic signal from the controller 522b and the output from the MUX 524 and supplies same to the motor 560 through the motor driver 540 shown in FIG. 1 so that the tray roulette 11 can be rotated in a direction that corresponds to the 2-bit logic signal. While the tray roulette 11 rotates, also the scanner electrode 400 contacts the start and the end electrodes.

In the meantime, the decoder 522a, in response to the ID code of the target dish 15 from the controller 522b, generates a pulse signal of a logic high to an end electrode, e.g., 412 illustrated in FIG. 1, which is selected in accordance with the ID code. When the scanner electrode 400 contacts the selected end electrode 412, the logic high pulse signal applied to the selected end electrode 412 is transferred to the F/F 522d, the MUX 524 and the PWM signal generation device 526 through the scanner electrode 400.

In response to the logic high pulse signal, the F/F 522d resets the drive signal from the OR gate 522c to provide a resetted signal of a zero value to the MUX 524; and at the rising edge of the logic high pulse signal, a PWM signal generator 526a in the PWM signal generation device 526 generates a PWM signal to provide same to an AND gate 526b. The AND gate 526b logically combines the PWM signal and the logic high pulse signal to output an AND operated PWM signal to the MUX 524. In response to the logic high pulse signal from the scanner electrode 400, the MUX 524 relays the AND operated PWM signal from the AND gate 526b to the first output circuitry 530a, regardless of the resetted signal of zero value which is the output from the F/F 522d. As can be seen from the above, before the scanner electrode 400 contacts the selected stop electrode 412, i.e., before the logic high pulse signal is provided through the scanner electrode 400, the MUX 524 outputs the drive signal supplied through the F/F 522d; and, thereafter, when the scanner electrode 400 contacts the selected stop electrode 412, i.e., when the logic high pulse signal is received through the scanner electrode 400, the MUX 524 outputs the AND operated PWM signal from the AND gate 526b.

If the AND operated PWM signal is received from the MUX 524, the first output circuit 530a produces a motor control signal corresponding to the AND operated PWM signal and provides same to the motor 560 through the motor driver 540, thereby reducing the speed of the rotation of the motor 560 and in turn reducing the speed of the rotation of the tray roulette 11.

Meanwhile, the logic high pulse signal from the scanner electrode 400 is inverted at an inverter 528a to send an inverted pulse signal, i.e., a logic low pulse signal, to the one-shot pulse generator 528b. In this case, no signal is generated from the one-shot pulse generator 528b to a second output circuit 530b.

If the scanner electrode 400 passes the selected end electrode 412 and locates itself between the electrode 412 and its neighboring electrode 409, i.e., at the falling edge of the logic high pulse signal from the scanner electrode 400 indicating the end of the logic high pulse signal, the MUX 524 selects and outputs the output from the F/F 522d instead of the output from the AND gate 526b. At this time, the output from the F/F 522d, however, has a zero value as the drive signal from the OR gate 522c is resetted at the F/F 522d in response to the logic high pulse signal. In this case, at the rising edge of the logic low pulse signal from the inverter 528a, the one-shot pulse generator 528b generates a one-shot pulse signal with a very small pulse width and applies same to the motor driver 540 through the second output circuit 530b, thereby halting the rotation of the motor 560 and in turn halting the rotation of the tray roulette 11. As a result, the target dish 15 can reach the exact pickup position Y when the scanner electrode 400 reaches a position between the electrodes 412 and 409. Also the one-shot pulse signal is provided to the controller 522b so that it can stand by for a next tray roulette control. Even though it is illustratively described for the case that the tray roulette rotates counterclockwise for the sake of simplicity, it should be noted that in case the tray roulette revolves clockwise, the rotation control of the tray roulette can be easily modified by employing the electrode contact method described above. As shown above, the inventive disk roulette control scheme is capable of considerably reducing a processing time required to control the rotation of the tray roulette and making its structure much simpler than the conventional scheme through the use of a novel electrode contact technique.

While the present invention has been described with respect to the preferred embodiments, other modifications and variations may be made without departing from the scope and spirit of the present invention as set forth in the following claims.

What is claimed is:

1. A method for controlling the rotation of a tray roulette for use in a disk changer, wherein the tray roulette has a plurality of dishes, each dish cradling a disk, the method comprising the steps of:

(a) providing a logic signal with a predetermined bit length for use in deciding the rotation and direction of the tray roulette in response to a user's instruction to search a target dish, and rotating the tray roulette based on a drive signal obtained by using the logic signal, the target dish being a dish holding a disk selected by the user to reproduce signals recorded on the disk at a pickup position;

(b) generating a pulse signal when a scanner electrode attached to the tray roulette contacts an end electrode which corresponds to the user's instruction while the tray roulette rotates, wherein the end electrode is attached to a base supporting the tray roulette;

(c) producing, in response to the pulse signal, a pulse width modulation (PWM) signal with a predetermined duty ratio, the PWM signal being used for reducing the rotation speed of the tray roulette;

(d) issuing a one-shot pulse signal after the generation of the PWM signal, the one-shot pulse signal being used for stopping the tray roulette when the target dish reaches the pickup position; and (e) controlling the rotation of the tray roulette based on the PWM signal, the one-shot pulse signal, the logic signal and the drive signal.

2. The method of claim 1, wherein the step (e) includes the steps of:

(e1) selectively outputting one of the drive signal and the PWM signal to supply the selected one to a motor associated with the tray roulette, thereby either driving the tray roulette or reducing the rotational speed, wherein the direction of the rotation depends on the logic signal; and (e2) stopping the rotation of the motor when the one-shot pulse signal is received from the one-shot pulse generating means, to thereby stop the rotation of the tray roulette.

3. The method of claim 2, wherein at the step (a) the drive signal is obtained based on the logic signal with the predetermined bit length.

4. The method of claim 2, wherein at the step (c) the PWM signal is generated by using the pulse signal.

5. The method of claim 4, wherein the PWM signal is issued at the rising edge of the pulse signal of a logic high.

6. The method of claim 5, wherein the step (d) includes the steps of:

(d1) inverting the pulse signal of the logic high to output an inverted pulse signal of a logic low; and (d2) issuing the one-shot pulse signal at the rising edge of the inverted pulse signal of the logic low.

7. An apparatus for controlling the rotation of a tray roulette for use in a disk changer, wherein the tray roulette has a plurality of dishes, each dish cradling a disk, the apparatus comprising:

first control means for providing a logic signal with a predetermined bit length for use in deciding the rotation and direction of the tray roulette in response to a user's instruction to search a target dish, and rotating the tray roulette based on a drive signal derived by using the logic signal, the target dish being a dish holding a disk selected by the user to reproduce signals from the disk at a pickup position;

means for generating a pulse signal when a scanner electrode attached to the tray roulette contacts an end electrode which corresponds to the user's instruction while the tray roulette rotates, wherein the end electrode is attached to a base supporting the tray roulette;

means, in response to the pulse signal, for generating a pulse width modulation (PWM) signal with a predetermined duty ratio, the PWM signal being used for reducing the rotation speed of the tray roulette;

means for producing a one-shot pulse signal after the generation of the PWM signal, the one-shot pulse signal being used for stopping the tray roulette when the target dish reaches the pickup position; and second control means for controlling the rotation of the tray roulette based on the PWM signal, the one-shot pulse signal, the logic signal and the drive signal.

8. The apparatus of claim 7, wherein the second control means includes:

means for selectively outputting one of the drive signal and the PWM signal to supply the selected one to a motor associated with the tray roulette, thereby either driving the tray roulette or reducing the rotation speed, wherein the direction of the rotation depends on the logic signal; and means for stopping the rotation of the motor when the one-shot pulse signal is received from the one-shot pulse generating means, to thereby stop the rotation of the tray roulette.

9. The apparatus of claim 8, wherein the drive signal is derived based on the logic signal with the predetermined bit length.

10. The apparatus of claim 8, wherein the PWM signal is generated by using the pulse signal.

11. The apparatus of claim 10, wherein the PWM signal is produced at the rising edge of the pulse signal of a logic high.

12. The apparatus of claim 11, wherein the one-shot pulse generation means includes:

means for inverting the pulse signal of the logic high to output an inverted pulse signal of a logic low; and means for issuing the one-shot pulse signal at the rising edge of the inverted pulse signal of the logic low.

13. A disk changer system comprising:

a tray roulette having a plurality of dishes, each dish cradling a disk;

a base for supporting the tray roulette;

pairs of electrodes, each pair including a start electrode and an end electrode attached to the base, wherein each pair is separated by an equal angular space;

a scanner electrode attached to the tray roulette, wherein the scanner electrode slidingly contacts start electrodes and end electrodes as the tray roulette rotates around a spindle which is fixed on the base;

a rotation controller for generating a motor control signal for use in driving a motor in response to a user's instruction to search a target dish;

a motor for driving the tray roulette based on the motor control signal, the motor being associated with the tray roulette by using the spindle; and a motor driver for supplying power, in response to the motor control signal, to the motor; and wherein the rotation controller includes:

first control means for providing a logic signal with a predetermined bit length for use in deciding the rotation and direction of the tray roulette in response to a user's instruction to search a target dish, and rotating the tray roulette based on a drive signal derived by using the logic signal, the target dish being a dish holding a disk selected by the user to reproduce signals from the disk at a pickup position;

means for generating a pulse signal when a scanner electrode attached to the tray roulette contacts an end electrode which corresponds to the user's instructions while the tray roulette rotates, wherein the end electrode is attached to the base supporting the tray roulette;

means, in response to the pulse signal, for generating a pulse width modulation (PWM) signal with a predetermined duty ratio, the PWM signal being used for reducing the rotation speed of the tray roulette;

means for producing a one-shot pulse signal after the generation of the PWM signal, the one-shot pulse signal being used for stopping the tray roulette when the target dish reaches the pickup position; and second control means for controlling the rotation of the tray roulette based on the PWM signal, the one-shot pulse signal, the logic signal and the drive signal.

14. The disk changer system of claim 13, wherein the second control means includes:

means for selectively outputting one of the drive signal and the PWM signal to supply the selected one to a motor associated with the tray roulette, thereby driving the tray roulette or reducing the rotation speed, wherein the direction of the rotation depends on the logic signal; and means for stopping the rotation of the motor when the one-shot pulse signal is received from the one-shot pulse generating means, to thereby stop the rotation of the tray roulette.

15. The disk changer system of claim 14, wherein the drive signal is obtained based on the logic signal with the predetermined bit length.

16. The disk changer system of claim 14, wherein the PWM signal is provided by using the pulse signal.

17. The disk changer system of claim 16, wherein the PWM signal is produced at the rising edge of the pulse signal of a logic high.

18. The disk changer system of claim 17, wherein the one-shot pulse generation means includes:

means for inverting the pulse signal of the logic high to output an inverted pulse signal of a logic low; and means for issuing the one-shot pulse signal at the rising edge of the inverted pulse signal of the logic low.

* * * * *